Aug. 30, 1932.  A. G. J. COUSINEAU  1,874,459
AIRCRAFT CONSTRUCTION
Filed July 9, 1930    6 Sheets-Sheet 1

Witness:
William P. Kilroy

Inventor:
Alfred G. J. Cousineau
By Hill & Hill
Attys.

Aug. 30, 1932.   A. G. J. COUSINEAU   1,874,459
AIRCRAFT CONSTRUCTION
Filed July 9, 1930   6 Sheets-Sheet 5

Patented Aug. 30, 1932

1,874,459

UNITED STATES PATENT OFFICE

ALFRED G. J. COUSINEAU, OF CHICAGO, ILLINOIS

AIRCRAFT CONSTRUCTION

Application filed July 9, 1930. Serial No. 466,752.

This invention relates to aircraft, and particularly to improvements in craft of the aeroplane type.

One object of the present invention is to provide a novel arrangement of wings whereby the supporting and lifting effect obtained is more uniformly distributed throughout the length of the craft.

Another object of the invention is to provide means for heating the wings to prevent the accumulation of sleet and the formation of ice thereon.

Another object of the invention is to provide a novel arrangement of ailerons for controlling the movement of the craft.

Another object of the invention is to provide a novel construction and arrangement of ailerons, stabilizer and elevator, and to provide novel means for controlling the operation of those devices.

Another object of the invention is to provide means for heating the ailerons, stabilizer and elevator to prevent the formation of ice thereon.

Another object of the invention is to provide a novel arrangement in aeroplane construction whereby the ailerons, stabilizer and elevator may be directly actuated by the pilot for controlling the operation of the ship in the event of failure of the regular controlling devices, thereby providing a factor of safety in the operation of the plane.

Another object of the invention is to provide a construction and arrangement of landing gear and associated parts whereby the shock of landing the plane is absorbed, thereby relieving the plane structure as a whole from the strains to which it would otherwise be subjected.

A further object of the invention is to provide a novel form of wing construction.

A still further object of the invention is to improve aircraft of the character disclosed in sundry details hereinafter described and particularly pointed out in the appended claims.

One embodiment of the present invention is shown for illustrative purposes in the accompanying drawings, in which

Fig. 8 is a transverse sectional view taken on the line 8—8 of Fig. 7;

Features of the present invention are shown in the illustrative embodiment as applied to an aeroplane comprising a fuselage 16, provided in the present instance, adjacent its forward end, with an internal combustion engine 17 having a propeller 18 associated therewith as is common in most types of aeroplane structure.

For supporting the plane in flight, the present invention contemplates a plurality of wings rigidly connected to the fuselage and comprising, in the present instance, an upper wing 19 extending entirely across and above the fuselage, lower wings 21 extending outwardly on opposite sides of the fuselage adjacent the forward and lower portion thereof, and intermediate wings 22 extending outwardly from opposite sides of the fuselage adjacent the central portion thereof and at a point substantially midway between the upper and lower wings 19 and 21, and positioned a substantial distance to the rear of the vertical plane thereof. By such an arrangement, the wings 22 provide a desirable lifting effect on the rear portion of the fuselage for reasons that will hereinafter appear as other features of the present invention are set forth.

It is well known among those familiar with the operation of aircraft that frequently under certain weather conditions, the formation of ice and sleet on the wings and other portions of the plane structure seriously interferes with the operation thereof and constitutes a very noticeable handicap in the handling of the plane on account of the increased weight to be supported.

To overcome this condition, the present invention contemplates the use of the exhaust gases from the engine 17, and in the construction shown for utilizing the heat of these gases, a tubular member 23 is positioned adjacent the lower side of the fuselage in a manner to extend longitudinally thereof from substantially the front end to adjacent the rear end of the fuselage.

Figures 4, 6, 7:
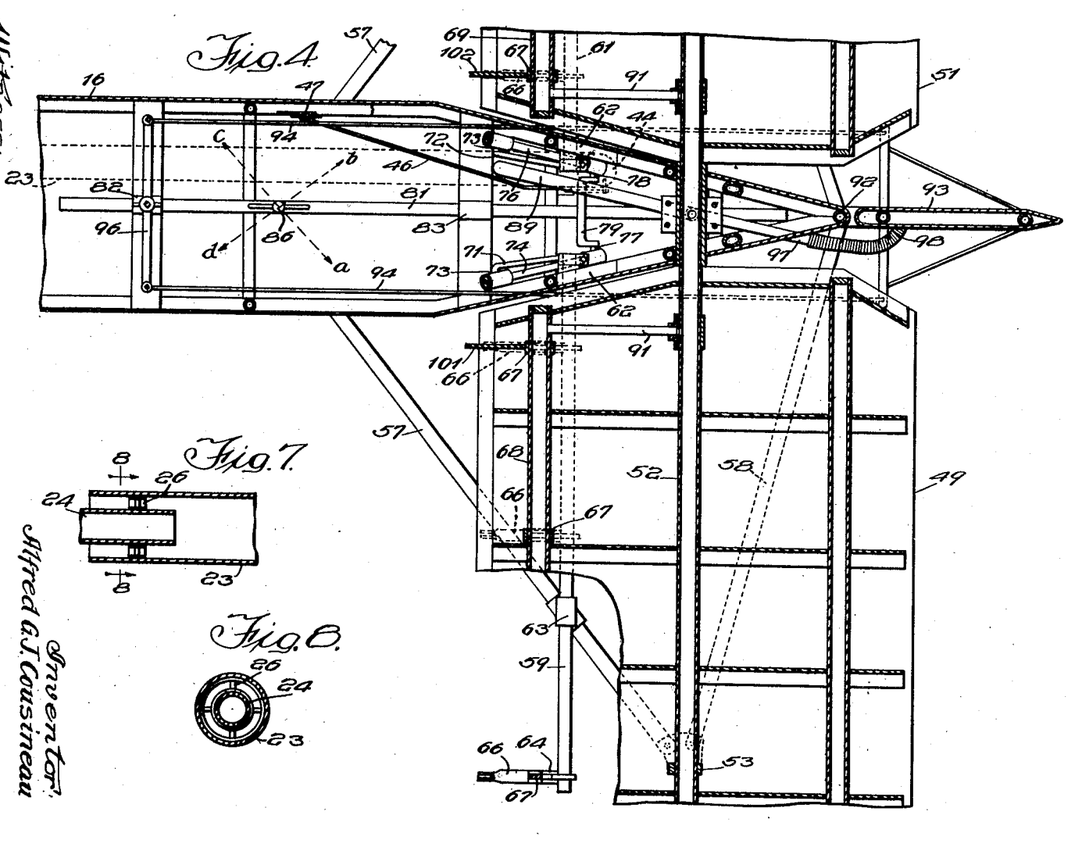
Fig. 4 is a sectional plan view of the structure shown in Fig. 3 and taken substantially as indicated by the line 4—4 thereof.
Fig. 6 is an enlarged fragmentary perspective view of a portion of the control mechanism positioned adjacent the rear end of the fuselage.
Fig. 7 is an enlarged fragmentary sectional elevation taken substantially as indicated by the line 7—7 of Fig. 2 and illustrating the arrangement of the exhaust manifold of the engine in relation to a tubular member for distributing heat to various portions of the plane.

For conducting the exhaust gases to the tubular member 23, the engine 17 is provided with an exhaust manifold 24 of somewhat less diameter than the tubular member 23 and terminating at its discharge end a short distance within the forward end of the member 23 as clearly shown in Fig. 7, the discharge end of the manifold 24 being positioned in a bracket or spacing member 26 positioned within the member 23 in a manner to support the manifold adjacent the central portion of the member and provide an air passage around the manifold and within the tubular member, thereby permitting air to mix with the exhaust gases within the member 23.

Figures 5, 9, 11, 12:
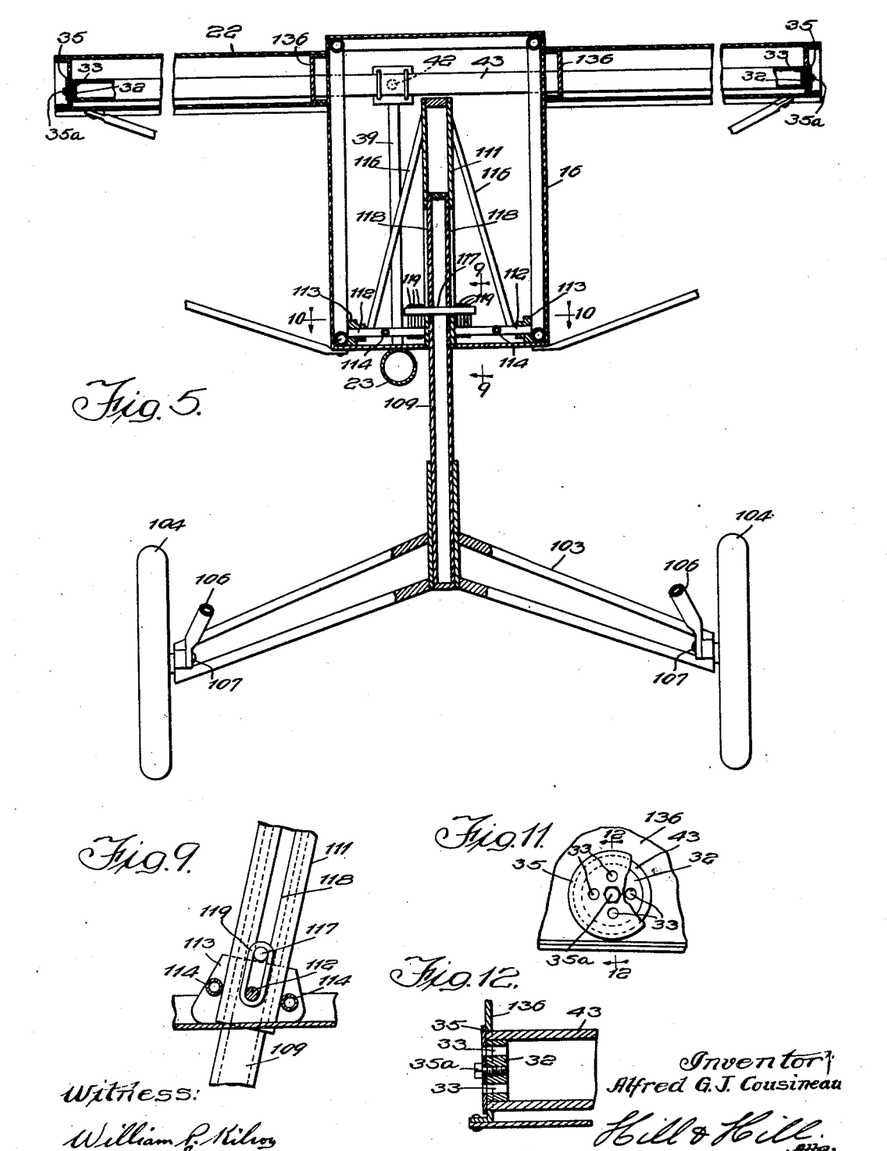
Fig. 5 is an enlarged fragmentary sectional view taken approximately on the line 5—5 of Fig. 1, and illustrating various features of the shock absorbing devices associated with the landing gear of the plane.
Fig. 9 is a fragmentary sectional view taken as indicated on the line 9—9 of Fig. 5.
Fig. 11 is a fragmentary elevational view of the end portion of one of the tubes positioned within the wings for conducting heat thereto and showing exhaust or discharge ports formed at the end of the tube.
Fig. 12 is a fragmentary sectional view taken on the line 12—12 of Fig. 11.
Figure 6:
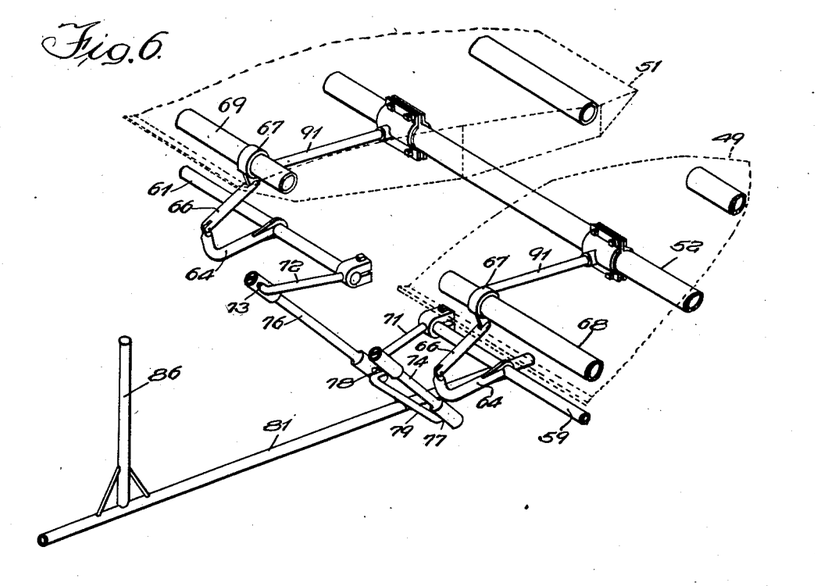

For conducting the exhaust gases to the wing 21, a short header 27 extending transversely of the fuselage is connected with the tubular member 23 by a nipple 28, and a longitudinally extending pipe or conduit 29 communicates at its rear end with the header 27 and at its forward end with a tube 31 extending transversely of the fuselage and into the wings 21 in a manner to provide a support therefor, the tube 31 being provided at its opposite ends with plugs or closure members 32 as clearly illustrated in Figs. 11 and 12, the said plugs 32 being provided with ports 33 adapted to permit the passage of the exhaust gases therethrough.

To assist in securing the wings against longitudinal displacement on their supporting tubes, a washer 35 of somewhat greater diameter than that of the tubes is secured adjacent the ends thereof by a bolt 35a screw-threaded into the plugs 32, as clearly shown in Figs. 11 and 12, the washers 35 being provided with apertures adapted to register with the apertures 33 formed in the plugs 32.

For conducting the exhaust gases to the wing 19, hollow uprights 34 are suitably positioned adjacent the opposite ends of the header 27 in a manner to communicate therewith, and the upper ends of the uprights 34 are adapted to communicate with the ends of a short header 36 positioned in the wing 19, while a pipe 37 communicating at its rear end with the header 36 and at its forward end with a tube 38 extending longitudinally of the wing 19, which serves as a support for the wing, and also to conduct the exhaust gases longitudinally of the wing 19 in a manner to be discharged at the opposite ends of the tube through ports formed in a plug positioned in the ends of the tube after the manner described with reference to the tube 31.

For conducting the exhaust gases to the wing 22, a pipe 39 is adapted to communicate at its lower end with the tubular member 23, and at its upper end with a tube 41, which is connected to the rear end of a pipe 42 adapted to communicate at its forward end with a vented tube 43 extending longitudinally along the forward edge of the wing 22 and having discharge openings adjacent its outer ends as described with reference to the tubes 31 and 38.

Figure 3:
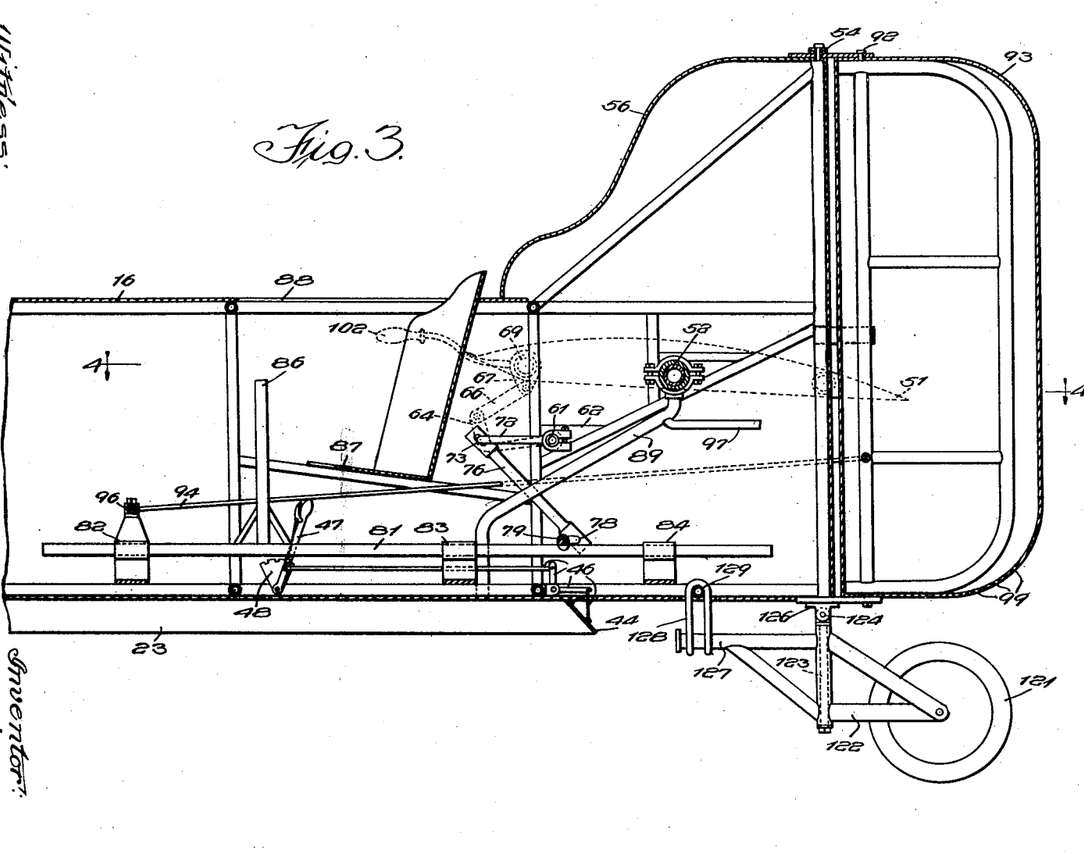
Fig. 3 is an enlarged fragmentary sectional elevation of the rear end portion of a plane embodying features of the present invention and taken substantially as indicated by the line 3—3 of Fig. 2.

Hingedly mounted adjacent the rear end of the tubular member 23 is a flap valve 44 adapted to cover the discharge end of the tube 23, the valve 44 being suitably connected by rod and lever connections 46 (Fig. 3) with a hand lever 47 provided with a detent 48 by which the valve may be secured in various positions of adjustment or may be held in extreme open position to permit the free passage of the exhaust gases and air through the tubular member 23 when not required for heating the wings.

It will be observed from the foregoing description that when necessary or desirable, the valve 44 may be closed or moved to desired position in order to trap the exhaust gases within the tubular member 23 and force them through the various connections above described to the various ported tubes 31, 38 and 43 in the wings 21, 19 and 22, respectively, for conducting the gases therethrough in a manner to heat the wings and prevent the accumulation of ice and sleet thereon.

For controlling the operation of the plane, particularly when in flight, and for providing suitable lifting effect adjacent the tail or rear end of the fuselage, the present invention contemplates the use of air foils 49 and 51 of substantial dimensions positioned on each side of the fuselage adjacent the rear end thereof. The present invention also contemplates the construction and arrangement of these air foils in a manner to combine in their structure the necessary stabilizers, ailerons and elevators for controlling the movements and operation of the plane and also to provide a suitable lifting effect adjacent the rear end of the fuselage.

For supporting the air foils 49 and 51 in desired position, a tube or pivot member 52 is rigidly mounted adjacent the rear end of the fuselage in a manner to extend therethrough and laterally therefrom a substantial distance to each side, and on which the foils 49 and 51 are pivotally mounted in a manner to tilt thereon and to be positioned at various angles with respect to the line of flight for obtaining the desired movement and operation of the plane, the outer end portions of the tube 52 being suitably mounted in supporting brackets 53 having upper brace members 54 connected adjacent the upper rear portion of the vertical stabilizer 56, and provided with lower brace members 57 and 58 suitably connected to the frame work of the fuselage.

For controlling the movements of the air foils 49 and 51, a pair of oppositely disposed rock shafts 59 and 61 are positioned on opposite sides of the fuselage, the said shafts having their inner or adjacent ends pivotally mounted in bearings 62 carried by the fuselage, and their outer or opposite end portions rotatably mounted in bearings 63 secured to the lower braces 57.

Spaced longitudinally of the rock shafts 59 and 61, and secured thereto, are a plurality of forwardly extending arms 64 having their forward ends pivotally connected to the lower ends of links 66, the upper or opposite ends of the links being pivotally connected to brackets 67 secured, at suitable intervals, to tubes 68 and 69 positioned in and extending longitudinally along the adjacent forward edges of the air foils 49 and 51, respectively.

Rigidly secured to the inner or adjacent ends of the respective rock shafts 59 and 61 within the fuselage are forwardly extending arms 71 and 72 having ball and socket connections indicated at 73 by which the arms are connected with drag links 74 and 76, respectively, the lower ends of the drag links having ball and socket connections indicated at 77 and 78, with the outer or opposite ends of a cross arm 79 rigidly secured to a rod 81 suitably mounted in bearings 82, 83 and 84 (Fig. 3) in a manner to slide longitudinally thereof and to have a rocking movement therein, the rod 81 being provided with a stick or control lever 86 suitably positioned adjacent the pilot's seat 87 in the cockpit 88 formed in the fuselage of the plane adjacent the rear end thereof.

It will be observed from the foregoing description that by manipulation of the stick 86 by the pilot, the rod 81 may be moved longitudinally in its bearings, or rocked therein, and through the connections just described, the air foils 49 and 51 may be positioned at various angles with respect to the line of flight. For example: by properly positioning the stick 86, the air foils 49 and 51 may both be positioned at a suitable angle in a manner to provide a desired lifting effect and support for the tail of the machine and for supporting the pilot's weight adjacent the rear end of the fuselage, thus serving as supporting air foils and has a horizontal stabilizer to assist in maintaining the ship on an even keel. By pulling the stick toward the pilot's seat, and thereby sliding the rod 81 longitudinally in its bearings, the rock shafts 59 and 61 will be rotated in a counter clockwise direction, as viewed in Figs. 1, 3 and 6, thus causing the forward or leading edges of the air foils 49 and 51 to be drawn downwardly and the foil to be rocked about a pivotal center formed by the tube or pivot member 52, thereby causing the air pressure to impinge on the upper surface of the foils, which, in such an instance, serve as elevators to cause the ship to zoom or nose upwardly, and by pushing the stick 86 and rod 81 forwardly, a clockwise movement will be imparted to the rock shafts 59 and 61, thereby moving the forward or leading edge of the air foils 49 and 51 upwardly in a manner to cause the air currents to impinge on the lower surface of the foils and cause the ship to dive or nose downwardly, and when the desired altitude, in either instance, is attained, the stick 86 may be shifted to its neutral or normal flying position to obtain the desired angle of the air foils 49 and 51 for suitably supporting the tail of the machine.

In the event that the craft should be tilted laterally, by adverse air currents, it may be brought back to an even keel by shifting the stick 86 sidewise and rocking the rod 81 in its bearings to tilt one of the air foils in one direction and the other in an opposite direction. For example: if it is desired to lift the right side of the machine to bring it onto an even keel, or to bank in making a left turn, the stick 86 and rod 81 may be rocked to the left, thereby causing the rock shaft 61 to be rotated in a clockwise direction to raise the leading edge of the air foil 51, while the rock shaft 59 will be rotated in a counter clockwise direction, thereby moving the leading edge of the air foil 49 downwardly, in which position, the air foils may be retained until the ship is brought to an even keel or the turn completed when the stick 86 may be returned to its normal or neutral position.

Obviously, to lift the left side of the machine, a tilting or rotating movement of the stick 86 and rod 81 to the right will have an opposite effect from that just described, for by rotating the rod 81 to the right, the rock shaft 59 will be rotated in a clockwise direction, thereby lifting the leading edge of the air foil 49, while the rock shaft 61 will be rotated in a counter clockwise direction, thereby drawing the leading edge of the air foil 51 downwardly in which position they may be held until such time as it is desired to put the machine on an even keel when the stick 86 may be returned to its normal position.

It will be observed from the foregoing description that by such an arrangement, the air foils 49 and 51 serve also as ailerons for controlling the operation of the plane.

In addition to the operation of the air foils as above described, namely, the moving of both foils simultaneously in the same direction or simultaneously rocking them about their pivotal connections with the tube 52 in opposite directions, suitable manipulation of the stick 86 may tilt one or the other of the air foils 49 or 51 in one or another direction while retaining the other air foil in its normal or stabilizing position. This may be done by moving the rod 81 longitudinally in its bearings in one direction or another and simultaneously rotating it to one side or another, thus causing the upper end of the stick 86 to follow a line positioned at substantially 45 degrees to the longitudinal axis of the rod 81, in which case it will be noticed, by reference to Fig. 4, that if the stick is moved in the direction of the arrow (a) that the rocking of the bar 81 to the left will cause the rock shaft 59 to be rotated in a counter clockwise direction, a movement which will be accelerated by the rearward sliding movement of the bar 81, and although the right hand end of the cross arm 79 is moved upwardly, its effect on the rock shaft 61 is neutralized by the rearward movement of the bar 81 and arm 79, thus causing the air foil 51 to maintain its normal or stabilizing position.

It will be observed also that a movement of the head or top of the stick 86 in the directions indicated by the arrows (b) (c) or (d), a similar action of the air foils 49 and 51 will be obtained, depending upon the direction in which the stick is moved.

From the construction and arrangement above described, it will be obvious that the air foils may be controlled by the stick 86 in a manner to serve as stabilizers, elevators or ailerons and in the latter instance, that the air foils 49 and 51 may be moved simultaneously in the opposite directions, or the stick 86 may be so manipulated as to move one foil in one or another direction without imparting any movement to the other foil, thereby providing a wide range of effect in operation and positioning of the foils.

For conducting the exhaust gases from the tubular member 23 to the movable air foils 49 and 51, a pipe or conduit 89 may be connected at its lower end to the tubular member 23, and at its upper end with the interior of the tube or pivot member 52 by which the exhaust gases and air may be conducted to the tube, and thence through pipes or conduits 91 to the tubes 68 and 69 extending longitudinally of the air foils adjacent the forward or leading edges thereof, and from which the exhaust gases may escape through the ported ends as described with reference to the tubes 31, 38 and 43 in the wings 21, 19 and 22, respectively.

Suitably positioned on a vertical axis 92 at the tail of the ship is a hollow rudder 93 suitably connected by means of links 94 with the opposite ends of a pivotally mounted foot operated bar 96 by which the lateral movements of the plane are controlled, and for conducting the gases of combustion to the interior of the rudder 93 to prevent the accumulation of ice and sleet thereon, a branch pipe 97 may be connected at its forward end with the pipe 89, and at its rear end with the interior of the rudder through a flexible connection 98, the rudder 93 being provided adjacent its lower and rear sides with a plurality of ports 99 (Fig. 3) by which the exhaust, or any condensation or other moisture may escape.

In the construction shown and described, wherein the stabilizers, elevators, ailerons and pilot's seat are positioned adjacent the rear end of the fuselage, it is found desirable to provide the air foils 49 and 51 adjacent the inner ends of their forward edges with hand grips 101 and 102, respectively, positioned within easy reach of the pilot when seated in the cockpit 88 of the fuselage, and by which the position of the pivotally mounted air foils 49 and 51 may be readily and directly controlled, an arrangement much to be desired in the event of failure of the control stick and associated parts normally used in the operation of the plane, it being apparent that in an emergency, the pilot, by grasping the hand grips 101 and 102, may bring the craft down under control to a safe landing.

For cushioning the shock of landing the craft on the ground, suitable landing gear is provided adjacent the forward and rear ends of the fuselage, the portion of the landing gear adjacent the forward end comprising an axle structure 103 (Fig. 5), on the outer ends of which are rotatably mounted landing wheels 104, the said axle being provided with links or braces 106 pivotally connected at their lower ends to the outer ends of the axle structure as indicated at 107, and pivotally connected at their upper or forward ends to the fuselage as indicated at 108, thereby permitting a degree of movement of the axle with respect to the fuselage. Rigidly mounted on the axle 103 adjacent the central portion thereof is an upwardly extending plunger 109 adapted to be received by a hollow tubular member 111 provided with trunnions 112 extending laterally therefrom and pivotally mounted in bearings 113 carried by the fuselage of the plane, the upper end of the member 111 being closed in a manner to provide a chamber therein, within which air may be compressed by the movement of the plunger 109 within the member.

Figures 1, 10:
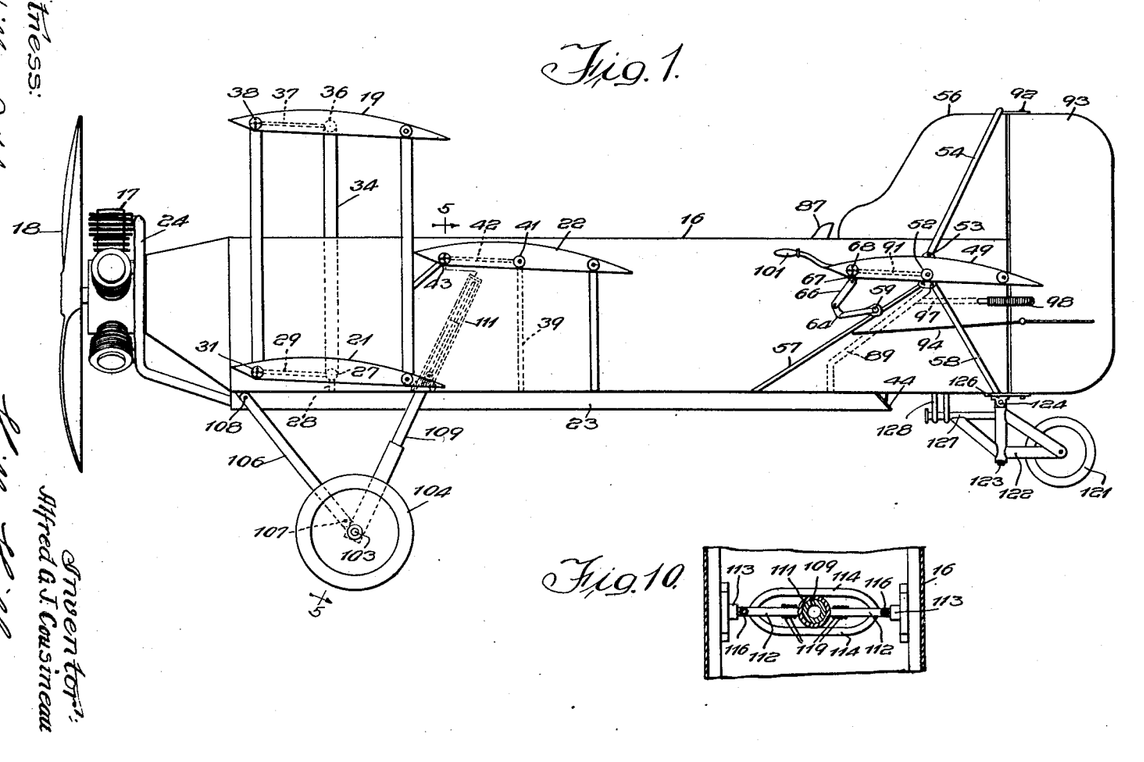
Fig. 1 is a side elevation of an aeroplane embodying features of the present invention and shown at an angle substantially as the plane would appear in flight, in other words, with the fuselage in substantially a horizontal position.
Fig. 10 is a sectional plan view taken on the line 10—10 of Fig. 5.
Figure 2:
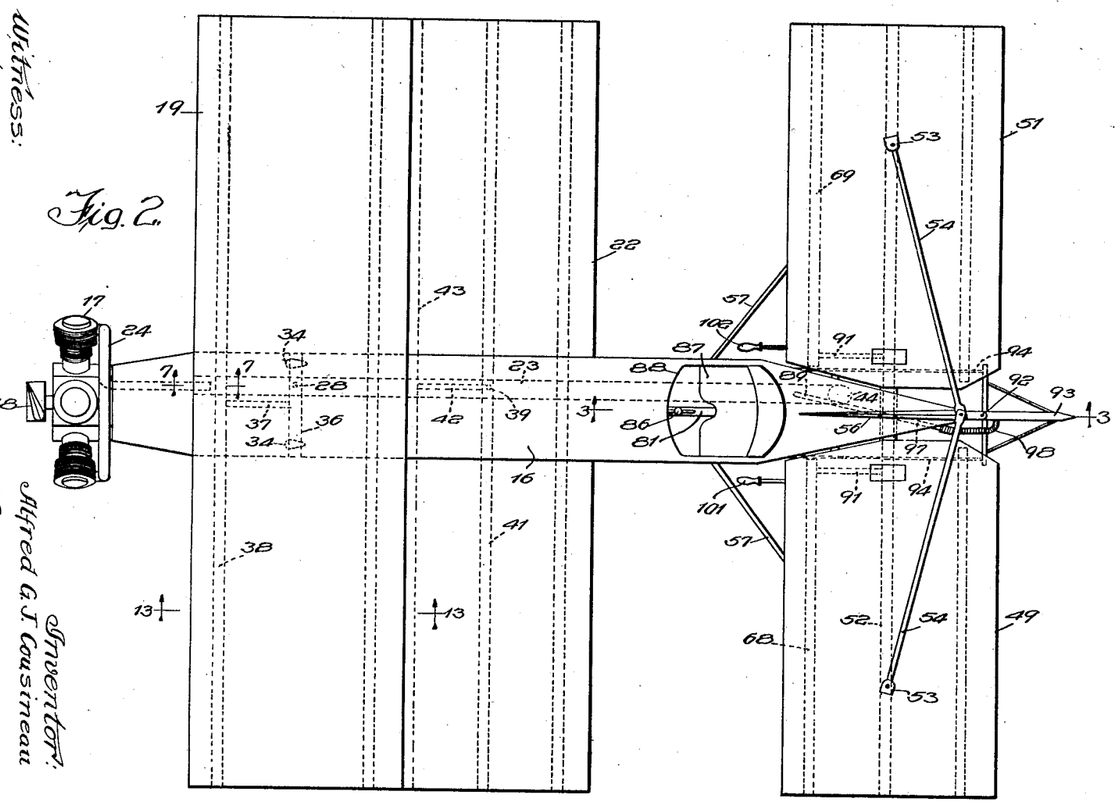
Fig. 2 is a plan view of the structure shown in Fig. 1.

As shown in Figs. 5 and 10, the trunnions 112 extend inwardly to adjacent the sides of the tubular member 111, and are rigidly connected thereto and braced in desired position by means of parallel, longitudinally extending brace members 114, and by inclined braces 116 connected at their upper ends to the upper portion of the tubular member 111 and at their lower ends to the trunnions 112 adjacent bearings 113.

Rigidly mounted in the plunger 109 is a transverse bar 117 adapted to extend laterally from opposite sides of the plunger and through elongated slots 118 formed in opposite sides of the tubular member 111, thereby permitting longitudinal movement of the plunger within the member 111. In the present structure, a plurality of resilient bands 119 of rubber or other suitable material are adapted to be looped around the bar 117 and the inner ends of the trunnions 112 in a manner yieldingly draw the bar and trunnions toward each other and to yield when a shock is applied to the landing gear, thus it will be observed that any movement of the axle 103 toward the fuselage will be yieldingly resisted by the bands 119 and the compression of air in the chamber formed adjacent the upper end of the tubular member 111, the pivoting of the tubular member in the fuselage and the connecting of the axle 103 to the fuselage by means of the links 106, providing a flexibility and yielding connection between the fuselage and the axle of the landing gear whereby a desirable cushioning effect is obtained when the plane is brought to a landing.

Positioned adjacent the rear end of the fuselage is another portion of the landing gear comprising a wheel 121 rotatably mounted at the rear end of a frame member 122 pivotally mounted adjacent its central portion on a vertically extending spindle 123, the upper end of which is pivotally mounted on a horizontally disposed axis 124 formed on a bracket 126 mounted on the fuselage of the plane. The frame 122 is adapted to extend forwardly of the vertically disposed spindle 123 in a manner to provide an arm 127 around which is looped the end portions of a resilient band 128 having its central portion trained over a rod or tube 129 carried by the frame work of the fuselage.

It will be observed from the foregoing description that any shock or force exerted on the wheel 121 in making a landing will cause the frame 122 to pivot around the horizontal axis 124 thereby putting a tension on the band 128 which will yield in a manner to prevent the shock of contact with the ground from being transmitted to the frame work and other parts of the plane.

It will be observed also that by providing a vertical pivot from the frame 122, the wheel 121 is permitted to move from side to side in maneuvering the machine on the ground, such movement being sufficient to cause the band 128 to yield and allow the wheel 121 to trail after the manner of a caster wheel, while the tension of the band 128 serves to bring the wheel into alignment with the plane when the latter is moved in a straight-away direction.

It will be observed from the foregoing description that a plane equipped with the type of landing gear disclosed may be brought to a three-point landing on the wheels 104 and 121 without any material shock being transmitted to the fuselage by reason of contact of the wheels with the ground.

Obviously, if desired, the wheel 121 may be removed and a tail skid or shoe may be secured in its place.

Figure 13:
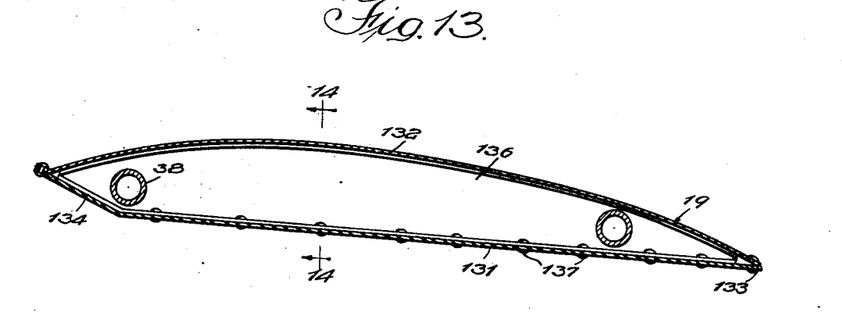
Fig. 13 is a transverse sectional view through one of the wings taken on the line 13—13 of Fig. 2 and illustrating features of the wing structure.

The present invention also provides a novel form of wing or air foil construction as clearly illustrated in Figs. 1 and 13, particularly the latter, wherein the wing is shown provided with a lower surface 131 and a cambered top surface 132 spaced therefrom, said surfaces terminating adjacent each other at their rear edges, and forming the trailing edge 133 of the wing or air foil, the forward portion of the wing being provided with a surface 134 inclined at an angle to the chord of the wing, and providing a surface for producing greater lifting effect than the undersurface of the wing or air foil. In the illustrative embodiment of the present structure, the lower surface 131 is shown as substantially flat and the surface 134 inclined at an angle thereto in a manner to produce an obtuse angle at the juncture of the surface 134 and bottom surface 131, and to provide an acute angle between the surface 134 and top surface 132 at the leading edge of the air foil.

Figure 14:
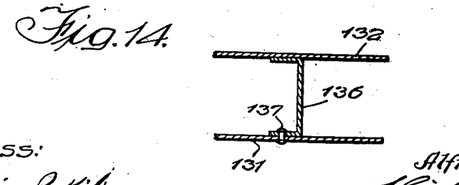
Fig. 14 is a fragmentary sectional view taken on the line 14—14 of Fig. 13.

Suitable ribs or struts 136 (Fig. 14) may be positioned within the wings or air foils and secured to the lower portion thereof by rivets 137 or other suitable means in a manner to retain the upper and lower portions of the wings or foils in spaced relation, and prevent the collapse of either when air pressure is exerted against either the top or bottom surface of the foils.

Obviously, the present invention is not limited to the precise construction and arrangement shown and described, as the same may be variously modified. Moreover, all the features of the invention need not be used conjointly as the same may be used to advantage in variously different combinations and sub-combinations.

What I claim as new and desire to cover by Letters Patent is:

1. An aeroplane comprising a fuselage, rigidly mounted supporting wings and propelling means associated therewith, air foils pivotally mounted on opposite sides of said fuselage adjacent the tail thereof, a control stick operatively connected to said air foils for moving them into various positions to serve as stabilizers, ailerons or elevators, and a pilot's seat in said fuselage adjacent said air foils and within physical reach thereof to enable the pilot to grasp the air foils and directly control the position thereof.

2. An aeroplane comprising a fuselage, rigidly mounted supporting wings and propelling means associated therewith, air foils pivotally mounted on opposite sides of said fuselage adjacent the tail thereof, a control stick operatively connected to said air foils for moving them into various positions to serve as stabilizers, ailerons or elevators, said fuselage having a cockpit formed therein adjacent said air foils, and hand grips adjacent the inner ends of the foils and within reach of a person occupying said cockpit.

3. An aeroplane comprising a fuselage, rigidly mounted supporting wings and propelling means associated therewith, a combined aileron, stabilizer and elevator foil pivotally mounted on each side of said fuselage adjacent the tail thereof, and means for controlling the position of said pivotally mounted foils, said means comprising a rotatable longitudinally movable rod, a control stick secured thereto, and a cross arm secured to said rod and operatively connected to said pivotally mounted foils.

4. An aeroplane comprising a fuselage, rigidly mounted supporting wings and propelling means associated therewith, a combined aileron, stabilizer and elevator foil pivotally mounted on each side of said fuselage adjacent the tail thereof, and means for controlling the position of said pivotally mounted foils, said means comprising a rotatable longitudinally movable rod, a control stick secured thereto, rock shafts operatively connected to said pivotally mounted foils, and a cross arm secured to said rod and operatively connected to said rock shafts.

5. An aeroplane comprising a fuselage, rigidly mounted supporting wings and propelling means associated therewith, a combined aileron, stabilizer and elevator foil pivotally mounted on each side of said fuselage adjacent the tail thereof, and means for controlling the position of said pivotally mounted foils, said means comprising a rotatable longitudinally movable rod, a control stick secured thereto, rock shafts operatively connected to said pivotally mounted foils and having arms secured to their inner or adjacent ends, a cross bar secured to said rod, and a pair of links having universal connections at their opposite ends with the ends of said cross bar and the ends of the arms secured to said rock shafts.

In witness whereof, I hereunto subscribe my name this 7th day of July A. D., 1930.

ALFRED G. J. COUSINEAU.